United States Patent [19]

Snow et al.

[11] Patent Number: 4,463,080

[45] Date of Patent: Jul. 31, 1984

[54] POLYMERIC MORDANTS

[75] Inventors: Robert A. Snow; Gerald W. Klein, both of Pittsford, N.Y.

[73] Assignee: Eastman Kodak Company, Rochester, N.Y.

[21] Appl. No.: 511,425

[22] Filed: Jul. 6, 1983

[51] Int. Cl.³ .......................... G03C 5/54; G03C 1/40; G03C 7/00; C08F 26/06

[52] U.S. Cl. .................................... 430/213; 428/500; 428/521; 525/326.7; 525/326.8; 525/328.2; 525/329.4; 525/327.1; 526/258; 526/259; 526/260; 526/261; 526/262; 526/268; 526/270; 526/266; 526/312; 430/941

[58] Field of Search ................ 430/213, 941; 526/258, 526/265, 260, 259, 261, 262, 312, 268, 270, 266; 525/916, 326.7, 326.8, 327.1, 328.2, 328.3, 329.4; 428/500, 521; 101/464

[56] References Cited

U.S. PATENT DOCUMENTS

| | | | |
|---|---|---|---|
| 3,958,995 | 5/1976 | Campbell et al. | 430/213 |
| 4,139,459 | 2/1979 | Costin | 525/327.1 |
| 4,147,548 | 4/1979 | Karino et al. | 430/213 |

*Primary Examiner*—Richard L. Schilling
*Attorney, Agent, or Firm*—Harold E. Cole

[57] ABSTRACT

Photographic elements and diffusion transfer assemblages are described which contain a novel polymeric mordant comprising recurring units having the formula

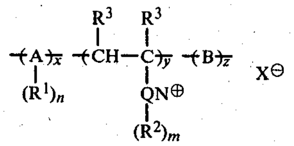

wherein A represents recurring units derived from an α,β-ethylenically unsaturated monomer;

B represents recurring units derived from a monomer containing at least two ethylenically unsaturated groups;

QN⊕ represents a moiety containing a quaternized nitrogen group;

$R^1$ represents an alkoxy group having from 1 to about 8 carbon atoms or an alkylenedioxy group having from 1 to about 4 carbon atoms, the group being appended to an aromatic group of A;

$R^2$ represents an alkoxy group having from 1 to about 8 carbon atoms or an alkylenedioxy group having from 1 to about 4 carbon atoms, the group being appended to an aromatic group of QN⊕;

each n and m independently represents an integer from 0 to 5, with the proviso that the polymer contains recurring units having at least two alkoxy groups or one alkylenedioxy group;

each $R^3$ independently represents hydrogen or an alkyl group having from 1 to about 6 carbon atoms;

X⊖ represents an anion;

x is from about 0 to about 80 mole percent;

y is from about 20 to about 100 mole percent; and z is from about 0 to about 10 mole percent.

36 Claims, No Drawings

POLYMERIC MORDANTS

This invention relates to photography, and more particularly to color diffusion transfer photography employing a novel polymeric mordant as herein defined. Dye images bound by the mordant of this invention have an improved stability to light.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure to a dye image-receiving layer comprising a mordant which binds the dye image thereto. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuses to the dye image-receiving layer to form an image of the original subject.

Dye stability is an important consideration in any photographic system. All photographic dyes are, to a greater or lesser degree, unstable to light. Any improvement in dye stability, however slight, is desirable provided other properties are not affected.

U.S. Pat. No. 3,958,995 discloses polymeric mordants similar to those of the invention, but do not contain any multiple alkoxy or alkylenedioxy substituents as described herein. As will be shown by comparative tests hereafter, such substituents on the mordant unexpectedly enable dyes bound thereto to have a greater stability to light.

U.S. Pat. No. 4,147,548 also discloses polymeric mordants similar to those of the invention, but do not contain any multiple alkoxy or alkylenedioxy substituents as described herein. This patent does disclose, however, that the mordant may have a single methoxy group thereon, although no data is given illustrating the advantage of such a substituent. As will be shown by comparative tests hereafter, multiple alkoxy or alkylenedioxy substituents as described herein on the mordant enable dyes bound thereto to have a greater stability to light in a synergistic manner.

The mordants of this invention also have good "dye-holding" properties which produce sharp images having good $D_{min}/D_{max}$ discrimination. In addition, these mordants are essentially colorless, have low stain, are stable upon keeping, are easy to coat using conventional techniques as latexes or solution polymers and do not produce dye hue shifts.

A photographic element in accordance with the invention comprises a support having thereon at least one photosensitive silver halide emulsion layer having associated therewith a dye image-providing material, the support also having thereon a dye image-receiving layer comprising a mordant which is a polymer comprising recurring units having the formula:

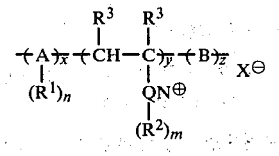

(I)

wherein

A represents recurring units derived from an α,β-ethylenically unsaturated monomer;

B represents recurring units derived from a monomer containing at least two ethylenically unsaturated groups;

$QN^{\oplus}$ represents a moiety containing a quaternized nitrogen group;

$R^1$ represents an alkoxy group having from 1 to about 8 carbon atoms or an alkylenedioxy group having from 1 to about 4 carbon atoms, the group being appended to an aromatic group of A;

$R^2$ represents an alkoxy group having from 1 to about 8 carbon atoms or an alkylenedioxy group having from 1 to about 4 carbon atoms, the group being appended to an aromatic group of $QN^{\oplus}$;

each n and m independently represents an integer from 0 to 5, with the proviso that the polymer contains recurring units having at least two alkoxy groups or one alkylenedioxy group;

each $R^3$ independently represents hydrogen or an alkyl group having from 1 to about 6 carbon atoms;

$X^{\ominus}$ represents an anion;

x is from about 0 to about 80 mole percent;

y is from about 20 to about 100 mole percent; and z is from about 0 to about 10 mole percent.

A in the formula above represents recurring units derived from one or more α,β-ethylenically unsaturated monomers such as acrylic esters, e.g., methyl methacrylate, butyl acrylate, butyl methacrylate, ethyl acrylate and cyclohexyl methacrylate; vinyl esters, such as vinyl acetate; amides, such as acrylamide, diacetone acrylamide, N-methylacrylamide and methacrylamide; nitriles, such as acrylonitrile, methacrylonitrile and vinylphenylacetonitrile; ketones, such as methyl vinyl ketone, ethyl vinyl ketone and p-vinylacetophenone; halides, such as vinyl chloride and vinylidene chloride; ethers, such as methyl vinyl ether, ethyl vinyl ether and vinylbenzyl methyl ether; α,β-unsaturated acids, such as acrylic acid and methacrylic acid and other unsaturated acids such as vinylbenzoic acid; simple heterocyclic monomers, such as vinylpyridine and vinylpyrrolidone; olefins, such as ethylene, propylene, butylene and styrene as well as substituted styrene; diolefins, such as butadiene and 2,3-dimethylbutadiene, and other vinyl monomers within the knowledge and skill of an ordinary worker in the art.

B in the formula above represents recurring units derived from a monomer containing at least two ethylenically unsaturated groups and includes the following: divinylbenzene, allyl acrylate, allyl methacrylate, N-allylmethacrylamide, 4,4'-isopropylidenediphenylene diacrylate, 1,3-butylene diacrylate, 1,3-butylene dimethacrylate, 1,4-cyclohexylenedimethylene dimethacrylate, diethylene glycol dimethacrylate, diisopropylene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, 1,6-hexamethylene dimethacrylate, N,N'-methylenebisacrylamide, neopentyl glycol dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidyne trimethacrylate, propylidyne triacrylate, vinyl allyloxyacetate, vinyl methacrylate and 1-vinyloxy-2-allyloxyethane. Divinylbenzene is a particularly preferred monomer.

$QN^{\oplus}$ in the above formula represents a moiety which contains a quaternized nitrogen group such as N-phenylenemethylene-N,N-trialkylammonium cationic groups such as

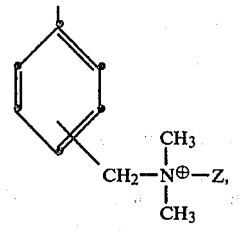

imidazolium cationic groups such as

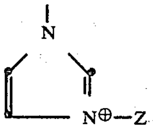
or
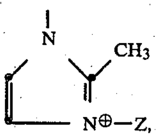

benzimidazolium cationic groups such as

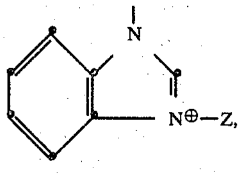

pyridinium cationic groups such as

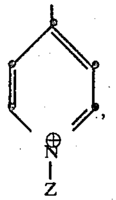

1-carbonyloxyalkylenepiperidinium cationic groups such as

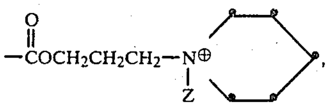

N-(carbonyloxyalkylene)-N,N,N-trialkylammonium cationic groups such as

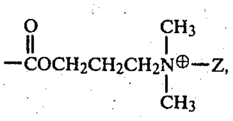

1-carbonyliminoalkylenepiperazinium cationic groups such as

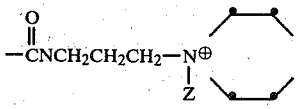
and 1-carbonyliminoalkylenemorpholinium cationic groups such as

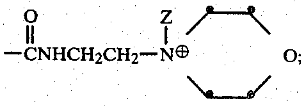

wherein Z is

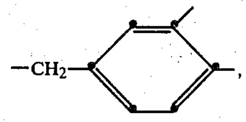

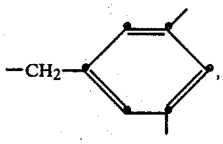

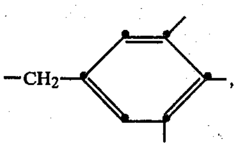

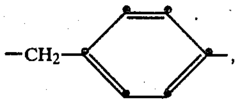

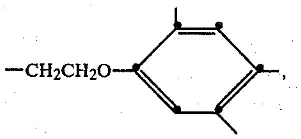

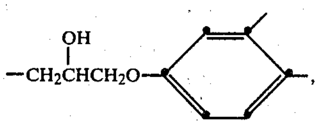

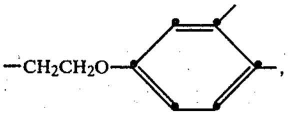

-continued

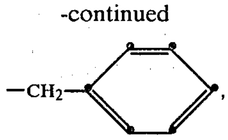

$CH_2CH_2OH$ or $CH_3$.

$R^1$ and $R^2$ in the above formula each independently represents at least one alkoxy (including substituted alkoxy) group of from 1 to about 8 carbon atoms, such as methoxy, ethoxy, benzyloxy, methoxyethoxy, propoxy, isopropoxy, or butoxy; or alkylenedioxy (including substituted alkylenedioxy) group having from 1 to about 7 carbon atoms such as methylenedioxy, ethylenedioxy, propylenedioxy or butylenedioxy.

$X^{\ominus}$ in the above formula represents an anion, such as bromide, chloride, acetate, a dialkyl phosphate, propionate, methyl sulfate, methyl sulfonate, or a benzene or substituted benzene sulfonate such as p-toluenesulfonate.

In a preferred embodiment of the invention, the polymer comprises recurring groups having the formula:

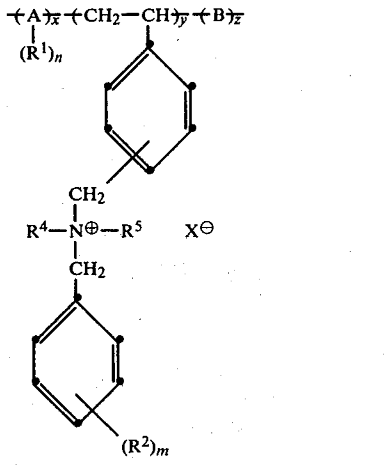

(II)

wherein $R^4$ and $R^5$ independently represents a carbocyclic group, such as aryl, e.g., phenyl; or cycloalkyl such as cyclohexyl or cyclopentyl; or an alkyl group, including a substituted alkyl group, e.g., aralkyl, methyl, ethyl, propyl, isobutyl, pentyl, hexyl, heptyl, decyl, benzyl, phenethyl or p-methylbenzyl; or $R^4$ and $R^5$ may be taken together to complete a 5- or 6-membered nitrogen-containing heterocyclic ring, and A, B, $R^1$, $R^2$, $X^{\ominus}$, n, m, x, y and z are as defined above.

In another preferred embodiment of the invention, the polymer comprises recurring units having the formula:

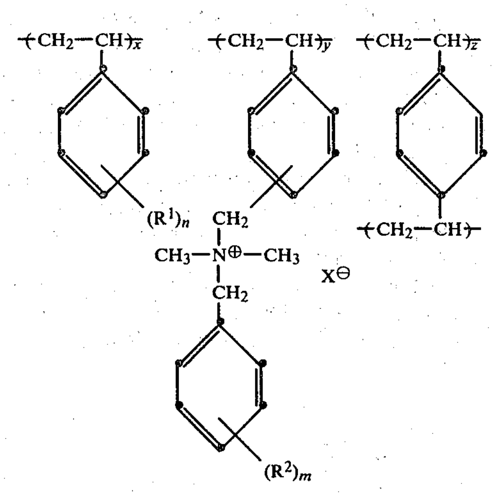

(III)

wherein $R^1$, $R^2$, $X^{\ominus}$, n, m, x, y and z are as defined above.

In Formula III, it is particularly preferred that m is 0, n is 2 and each $R^1$ is methoxy located in the 3- and 4-positions, or m is 0, n is 1 and $R^1$ represents 3,4-methylenedioxy. In other preferred embodiments of Formula III, n is 0, m is 2 and each $R^2$ is methoxy located in the 3- and 4-positions, or n is 0, m is 1 and $R^2$ represents 3,4-methylenedioxy. In yet other preferred embodiments of Formula III, n and m independently represents either 1 or 2, and $R^1$ and $R^2$ each independently represents methoxy in the 4 position, methoxy in the 3- and 4-positions or 3,4-methylenedioxy.

The crosslinked polymers of the invention can be prepared as latexes by emulsion polymerization techniques using monomers containing the requisite alkoxy or alkylenedioxy groups, such as described in Examples A and B of U.S. Pat. No. 3,958,995, the disclosure of which is hereby incorporated by reference. Alternatively, intermediate polymers can be prepared from monomers having an active halogen group such as vinylbenzyl chloride and reacting the active halogen group with a tertiary amine to produce the quaternary nitrogen group containing polymer. Conversely, an intermediate polymer can be produced as above except incorporating a tertiary amine monomer such as N,N-dimethyl-N-vinyllbenzyl amine and quaternizing with a suitable quaternizing agent such as a methanesulfonate ester alkylating agent. In these alternative procedures, either the alkylating agent or the tertiary amine can contain the desired alkoxy or alkylenedioxy groups.

Conventional bulk, solution or bead vinyl addition polymerization techniques can also be used to prepare the polymers of this invention as described in M. P. Stevens, "Polymer Chemistry—An Introduction", Addison Wesley Publishing Company, Reading, Mass. (1975), the disclosure of which is hereby incorporated by reference.

Examples of novel polymers within the scope of the invention include the following:

COMPOUND 1

Poly[styrene-co-N-(3,4-dimethoxybenzyl)-N,N-dimethyl-N-vinylbenzylammonium chloride-co-divinylbenzene] (mole ratio 49.5/49.5/1.0)

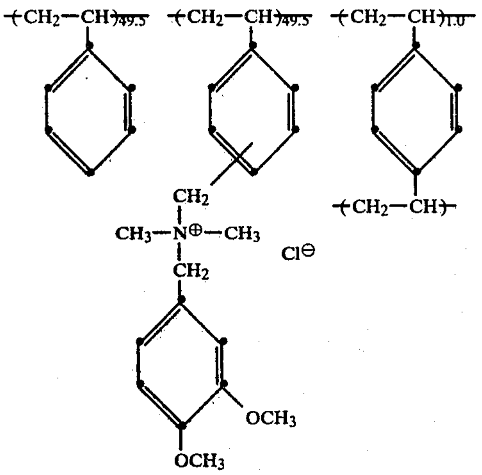

COMPOUND 2

Poly[styrene-co-N-(3,4-methylenedioxybenzyl)-N,N-dimethyl-N-vinylbenzylammonium chloride-co-divinylbenzene] (mole ratio 49.5/49.5/1.0)

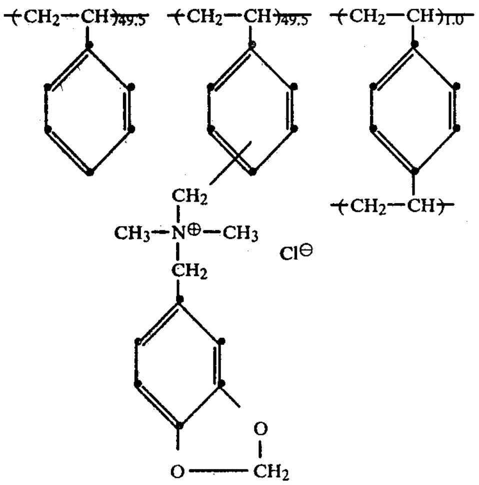

COMPOUND 3

Poly(3,4-dimethoxystyrene-co-N-benzyl-N,N-dimethyl-N-vinylbenzylammonium chloride-co-divinylbenzene) (mole ratio 49.5/49.5/1.0)

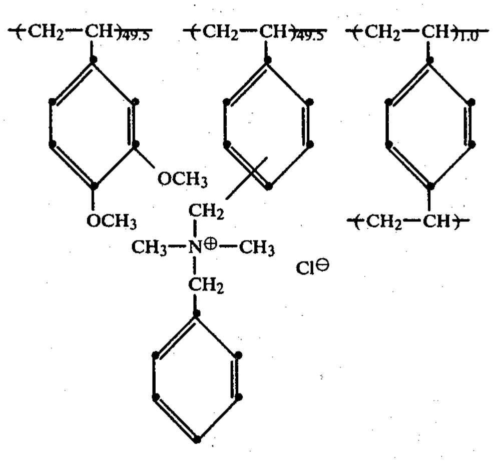

COMPOUND 4

Poly[4-methoxystyrene-co-N-(4-methoxybenzyl)-N,N-dimethyl-N-vinylbenzylammonium chloride-co-divinylbenzene] (mole ratio 49.5/49.5/1.0)

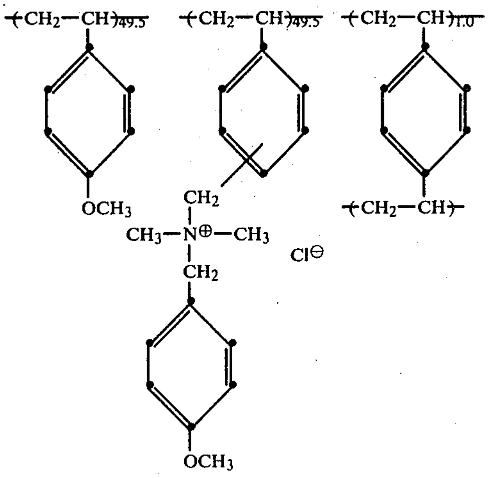

COMPOUND 5

Poly[4-methoxystyrene-co-N-(3,4-dimethoxybenzyl)-N,N-dimethyl-N-vinylbenzylammonium chloride-co-divinylbenzene] (mole ratio 49.5/49.5/1.0)

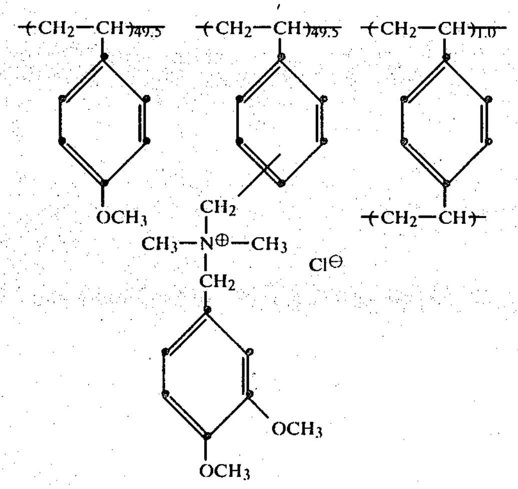

COMPOUND 6

Poly[3,4-dimethoxystyrene-co-N-(3,4-dimethoxybenzyl)-N,N-dimethyl-N-vinylbenzylammonium chloride-co-divinylbenzene] (mole ratio 49.5/49.5/1.0)

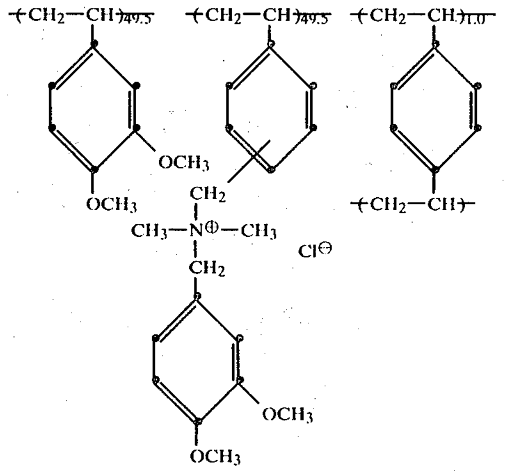

COMPOUND 7

Poly[3,4-methylenedioxystyrene-co-N-(3,4-dimethoxybenzyl)-N,N-dimethyl-N-vinylbenzylammonium chloride-co-divinylbenzene] (mole ratio 49.5/49.5/1.0)

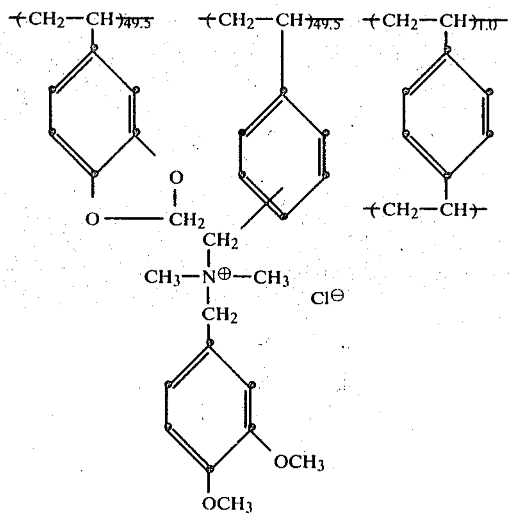

COMPOUND 8

Poly(3,4-methylenedioxystyrene-co-N-benzyl-N,N-dimethyl-N-vinylbenzylammonium chloride) (mole ratio 50/50)

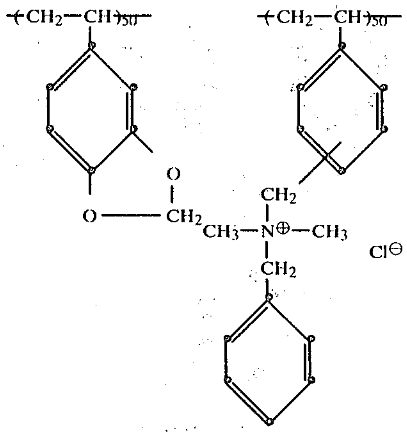

COMPOUND 9

Poly[3,4-methylenedioxystyrene-co-N-(3,4-methylenedioxybenzyl)-N,N-dimethyl-N-vinylbenzylammonium chloride] (mole ratio 50/50)

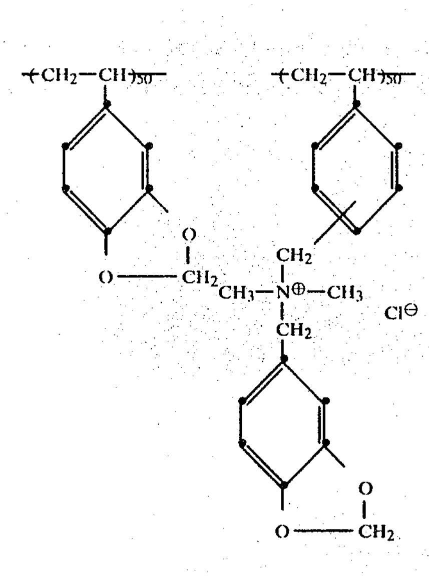

COMPOUND 10

Poly[styrene-co-N-(3,4-dimethoxybenzyl)-N,N-dimethyl-N-vinylbenzylammonium chloride] (mole ratio 50/50)

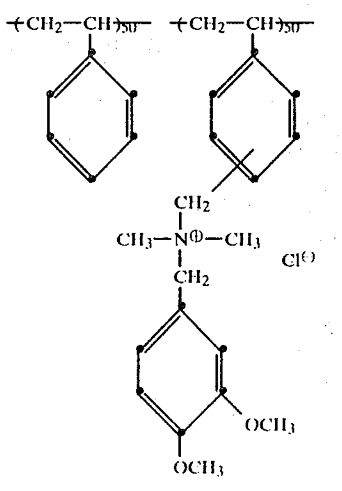

COMPOUND 11

Poly[3,4-methylenedioxystyrene-co-N-(3,4-methylenedioxybenzyl)-N,N-dimethyl-N-vinylbenzylammonium chloride-co-divinylbenzene] (mole ratio 49.5/49.5/1.0)

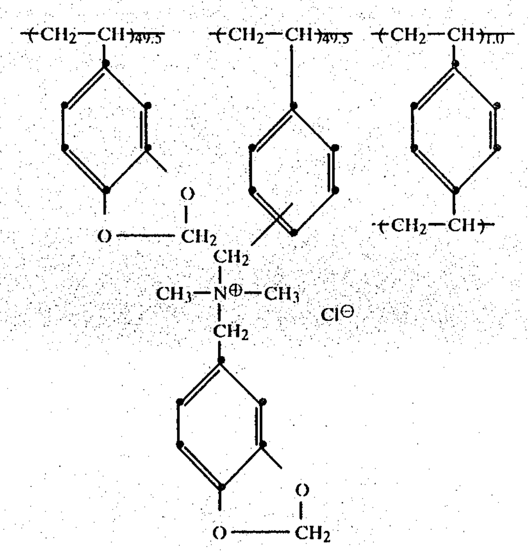

COMPOUND 12

Poly[acrylonitrile-co-N-(3,4-dimethoxybenzyl)-N,N-dimethyl-N-vinylbenzylammonium chloride-co-divinylbenzene] (mole ratio 49.5/49.5/1.0)

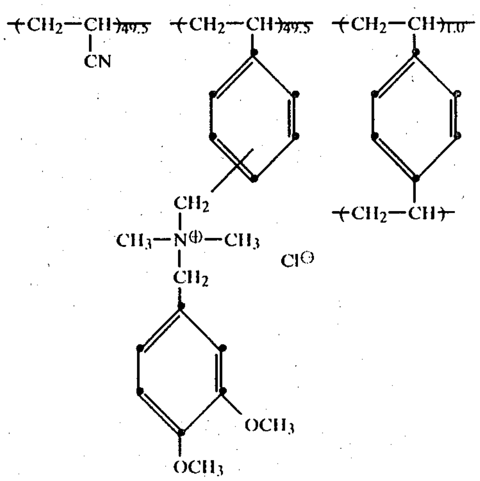

COMPOUND 13

Poly[acrylonitrile-co-N-(3,4-methylenedioxybenzyl)-N,N-dimethyl-N-vinylbenzylammonium chloride-co-divinylbenzene] (mole ratio 49.5/49.5/1.0)

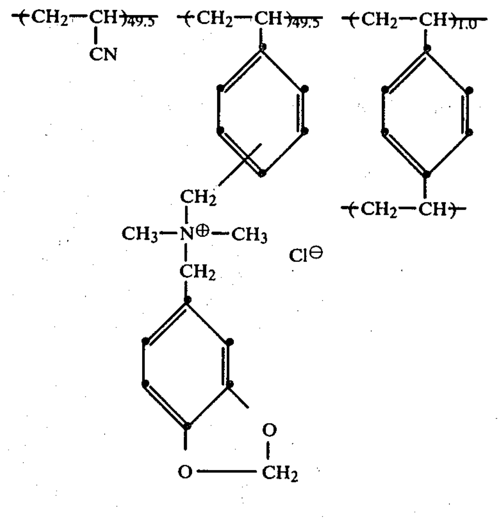

COMPOUND 14

Poly[cyclohexyl methacrylate-co-N-(3,4-methylenedioxybenzyl)-N,N,-dimethyl-N-vinylbenzylammonium chloride-co-ethylene dimethacrylate] (mole ratio 49.5/49.5/1.0)

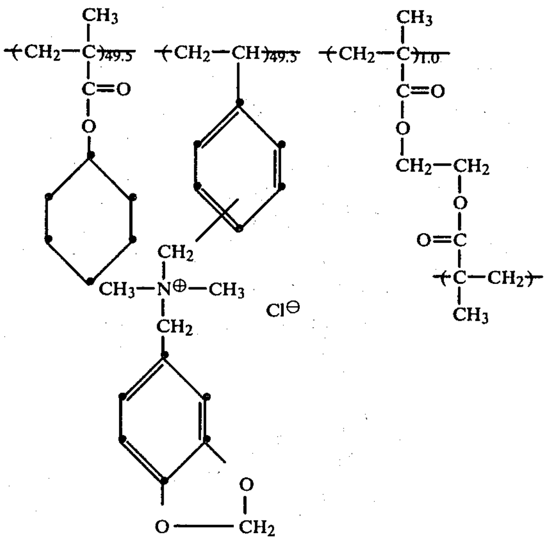

COMPOUND 15

Poly[cyclohexyl methacrylate-co-methacrylonitrile-co-N-(3,4-dimethoxybenzyl)-N,N-dimethyl-N-vinylbenzylammonium chloride-co-divinylbenzene] (mole ratio 25/25/49/1.0)

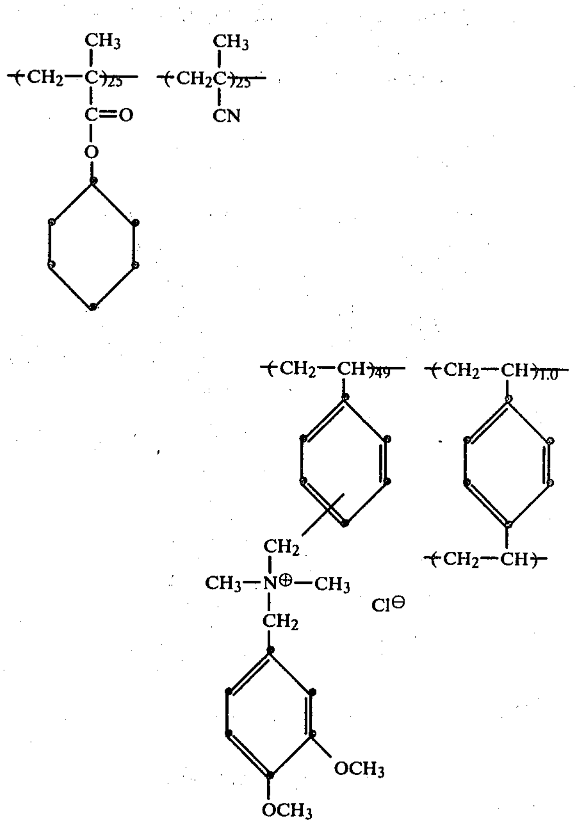

COMPOUND 16

Poly[2-(2,4,5-trimethoxyphenoxy)ethyl methacrylate-co-N-benzyl-N,N-dimethyl-N-vinylbenzylammonium chloride-co-divinylbenzene] (mole ratio 49.5/49.5/1.0)

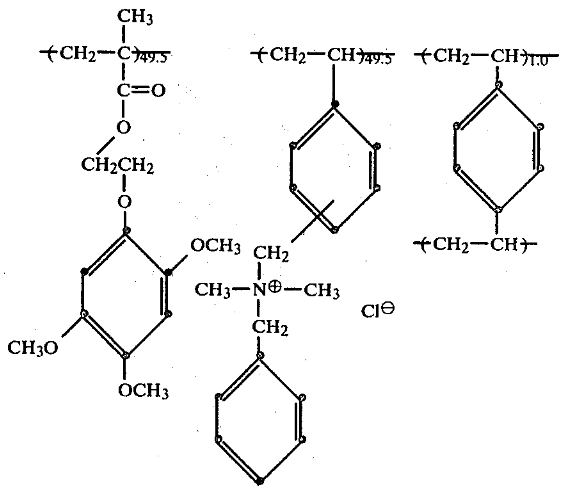

COMPOUND 17

Poly{3,4-dimethoxystyrene-co-N-[2-(2,4,5-trimethoxyphenoxy)ethyl]-N,N-dimethyl-N-vinylbenzylammonium chloride} (mole ratio 72.5/27.5)

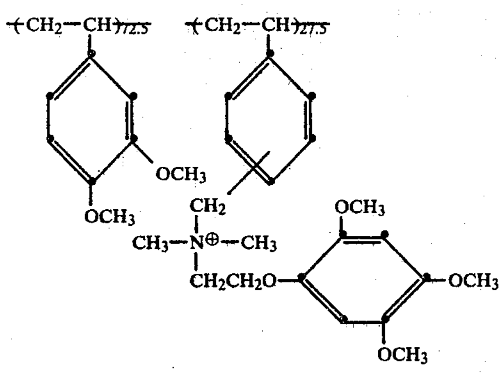

COMPOUND 18

Poly{3,4methylenedioxystyrene-co-1-vinylimidazole-co-3-[2-(4,5-methylenedioxyphenoxy)ethyl]-1-vinylimidazolium chloride} (mole ratio 25/50/25)

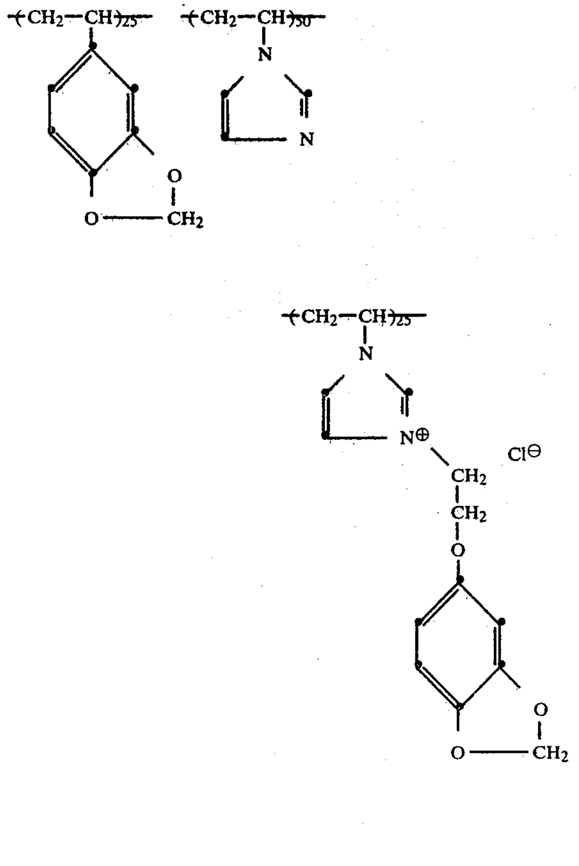

COMPOUND 19

Poly{N-[2-(3,4-methylenedioxyphenoxy)-ethyl]acrylamide-co-N-(3-acrylamidopropyl)-N,N-dimethyl-N-[2-(2,4,5-trimethoxyphenoxy)ethyl]ammonium methyl sulfonate} (mole ratio 60/40)

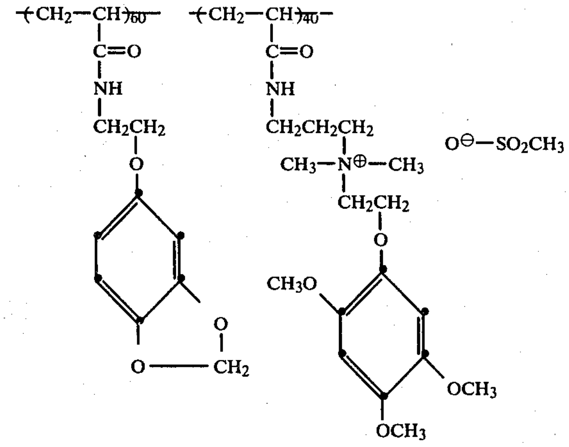

As described above, the mordants of the invention have at least two alkoxy groups or one alkylenedioxy group per quaternary nitrogen atom. Such groups or group can be located on either the $\alpha,\beta$-ethylenically unsaturated monomer, the nitrogen-quaternizing substituent, or both.

The photographic element described above can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic assemblage in accordance with this invention is adapted to be processed by an alkaline processing composition, and comprises:

(1) a photographic element as described above; and (2) a dye image-receiving layer.

In this embodiment, the processing composition may be inserted into the assemblage, such as by interjecting processing solution with communicating members similar to hypodermic syringes which are attached either to a camera or camera cartridge. The processing composition can also be applied by means of a swab or by dipping in a bath, if so desired. Another method of applying processing composition to a film assemblage which can be used in our invention is the liquid spreading means described in U.S. Pat. No. 4,370,407 of Columbus, issued Jan. 25, 1983.

In a preferred embodiment of the invention, the assemblage itself contains the alkaline processing composition and means containing same for discharge within the film unit. There can be employed, for example, a rupturable container which is adapted to be positioned so that during processing of the film unit, a compressive force applied to the container by pressure-applying members, such as would be found in a camera designed for in-camera processing, will effect a discharge of the container's contents within the film unit.

The dye image-providing material useful in this invention is either positive- or negative-working, and is either initially mobile or immobile in the photographic element during processing with an alkaline composition. Examples of initially mobile, positive-working dye image-providing materials useful in this invention are described in U.S. Pat. Nos. 2,983,606; 3,536,739; 3,705,184; 3,482,972; 2,756,142; 3,880,658 and 3,854,985. Examples of negative-working dye image-providing materials useful in this invention include conventional couplers which react with oxidized aromatic primary amino color developing agents to produce or release a dye such as those described, for example, in U.S. Pat. No. 3,227,550 and Canadian Pat. No. 602,607. In a preferred embodiment of this invention, the dye image-providing material is a ballasted, redox-dye-releasing (RDR) compound. Such compounds are well known to those skilled in the art and are, generally speaking, compounds which will react with oxidized or unoxidized developing agent or electron transfer agent to release a dye. Such nondiffusible RDR's include negative-working compounds, as described in U.S. Pat. Nos. 3,728,113 of Becker et al; 3,725,062 of Anderson and Lum; 3,698,897 of Gompf and Lum; 3,628,952 of Puschel et al; 3,443,939 and 3,443,940 of Bloom et al; 4,053,312 of Fleckenstein; 4,076,529 of Fleckenstein et al; 4,055,428 of Koyama et al; 4,149,892 of Deguchi et al; 4,198,235 and 4,179,291 of Vetter et al; *Research Disclosure* 15157, November, 1976 and *Research Disclosure* 15654, April, 1977.

Such nondiffusible RDR's also include positive-working compounds, as described in U.S. Pat. Nos. 3,980,479; 4,139,379; 4,139,389; 4,199,354, 4,232,107, 4,199,355 and German Pat. No. 2,854,946, the disclosures of which are hereby incorporated by reference.

In a preferred embodiment of the invention, RDR's such as those in the Fleckenstein et al patent referred to above are employed. Such compounds are ballasted sulfonamido compounds which are alkali-cleavable upon oxidation to release a diffusible dye from the nucleus and having the formula:

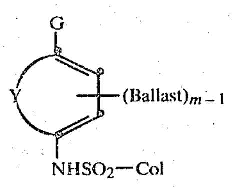

wherein:

(a) Col is a dye or dye precursor moiety;

(b) Ballast is an organic ballasting radical of such molecular size and configuration (e.g., simple organic groups or polymeric groups) as to render the compound nondiffusible in the photosensitive element during development in an alkaline processing composition;

(c) G is $OR^6$ or $NHR^7$ wherein $R^6$ is hydrogen or a hydrolyzable moiety and $R^7$ is hydrogen or a substituted or unsubstituted alkyl group of 1 to 22 carbon atoms, such as methyl, ethyl, hydroxyethyl, propyl, butyl, secondary butyl, tertiary butyl, cyclopropyl, 4-chlorobutyl, cyclobutyl, 4-nitroamyl, hexyl, cyclohexyl, octyl, decyl, octadecyl, docosyl, benzyl or phenethyl (when $R^7$ is an alkyl group of greater than 6 carbon atoms, it can serve as a partial or sole Ballast group);

(d) Y represents the atoms necessary to complete a benzene nucleus, a naphthalene nucleus or a 5- to 7-membered heterocyclic ring such as pyrazolone or pyrimidine; and (e) m is a positive integer or 1 to 2 and is 2 when G is $OR^6$ or when $R^7$ is a hydrogen or an alkyl group of less than 8 carbon atoms.

For further details concerning the above-described sulfonamido compounds and specific examples of same, reference is made to the above-mentioned Fleckenstein et al U.S. Pat. No. 4,076,529.

In another preferred embodiment of the invention, positive-working, nondiffusible RDR's of the type disclosed in U.S. Pat. Nos. 4,139,379 and 4,139,389 are employed. In this embodiment, an immobile compound is employed which as incorporated in a photographic element is incapable of releasing a diffusible dye. However, during photographic processing under alkaline conditions, the compound is capable of accepting at least one electron (i.e., being reduced) and thereafter releases a diffusible dye. These immobile compounds are ballasted electron accepting nucleophilic displacement compounds.

The dye image-receiving layer in the abovedescribed film assemblage is optionally located on a separate support adapted to be superposed on the photographic element after exposure thereof. Such image-receiving elements are generally disclosed, for example, in U.S. Pat. No. 3,362,819.

When the means for discharging the processing composition is a rupturable container, it is usually positioned in relation to the photographic element and the image-receiving element described above so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

In another embodiment, the dye image-receiving layer in the above-described film assemblage is integral with the photographic element and is located between the support and the lowermost photosensitive silver halide emulsion layer. One useful format for integral negative-receiver photographic elements is disclosed in Belgian Pat. No. 757,960. In such an embodiment, the support for the photographic element is transparent and is coated with a dye image-receiving layer as described above, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the abovementioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the dye image-receiving layer described above, a substantially opaque, light-reflective layer and the photosensitive layer or layers described above. A rupturable container, containing an alkaline processing composition and an opacifier, is positioned between the top layer and a transparent cover sheet which has thereon, in sequence, a neutralizing layer, and a timing layer. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye image-providing material. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

A process for producing a photographic transfer image in color according to the invention from an imagewise-exposed photosensitive element comprising a support having thereon at least one photosensitive silver halide emulsion layer having associated therewith a dye image-providing material, comprises treating the element with an alkaline processing composition in the presence of a silver halide developing agent to effect development of each of the exposed silver halide emulsion layers. An imagewise distribution of dye image-providing material is formed as a function of development and at least a portion of it diffuses to a dye image-receiving layer to provide the transfer image.

The film unit or assemblage of the present invention is used to produce positive images in single or multicolors. In a three-color system, each silver halide emulsion layer of the film assembly will have associated therewith a dye image-providing material which possesses a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith and the red-sensitive silver halide emulsion layer will have a cyan dye image-providing material associated therewith. The dye image-providing material associated with each silver halide emulsion layer is contained either in the silver halide emulsion layer itself or in a layer contiguous to the silver halide emulsion layer, i.e., the dye image-providing material can be coated in a separate layer underneath the silver halide emulsion layer with respect to the exposure direction.

The concentration of the dye image-providing material that is employed in the present invention can be varied over a wide range, depending upon the particular compound employed and the results desired. For example, the dye image-providing material coated in a layer at a concentration of 0.1 to 3 $g/m^2$ has been found to be useful. The dye image-providing material is usually dispersed in a hydrophilic film forming natural material or synthetic polymer, such as gelatin, polyvinyl alcohol, etc, which is adapted to be permeated by aqueous alkaline processing composition.

A variety of silver halide developing agents are useful in this invention. Specific examples of developers or electron transfer agents (ETA's) useful in this invention include hydroquinone compounds, aminophenol compounds, catechol compounds, 3-pyrazolidinone compounds, such as those disclosed in column 16 of U.S. Pat. Nos. 4,358,527, issued Nov. 9, 1982. A combination of different ETA's, such as those disclosed in U.S. Pat. No. 3,039,869, can also be employed. These ETA's are employed in the liquid processing composition or contained, at least in part, in any layer or layers of the photographic element or film assemblage to be activated by the alkaline processing composition, such as in the silver halide emulsion layers, the dye image-providing material layers, interlayers, image-receiving layer, etc.

In the invention, dye image-providing materials can be used which produce diffusible dye images as a function of development. Either conventional negative-working or direct-positive silver halide emulsions are employed. If the silver halide emulsion employed is a direct-positive silver halide emulsion, such as an internal image emulsion designed for use in the internal range reversal process, or a fogged, direct-positive emulsion such as a solarizing emulsion, which is developable in unexposed areas, a positive image can be obtained on the dye image-receiving layer by using negative-working ballasted, redox dye-releasers. After exposure of the film assemblage or unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-initiated reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stablize the image.

Internal image silver halide emulsions useful in this invention are described more fully in the November, 1976 edition of *Research Disclosure,* pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

The dye image-receiving layers containing the novel mordants of this invention may also contain a polymeric vehicle as long as it is compatible therewith. Suitable materials are disclosed, for example, in U.S. Pat. No. 3,958,995, and in *Product Licensing Index,* 92, December, 1971, Publ. No. 9232; page 108, paragraph VIII, the disclosures of which are hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure,* and pages 35 through 37 of the July 1975 edition of *Research Disclosure,* the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g, alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November, 1976 edition of *Research Disclosure,* the disclosure of which is hereby incorporated by reference.

The alkaline solution permeable, substantially opaque, light-reflective layer employed in certain embodiments of photographic film units used in this invention is described more fully in the November, 1976 edition of *Research Disclosure,* page 82, the disclosure of which is hereby incorporated by reference.

The supports for the photographic elements used in this invention can be any material, as long as it does not deleteriously affect the photographic properties of the film unit and is dimensionally stable. Typical flexible sheet materials are described on page 85 of the November, 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. Pat. No. 4,362,806, issued Dec. 7, 1982.

The silver halide emulsions useful in this invention, both negative-working and direct-positive ones, are well known to those skilled in the art and are described in *Research Disclosure,* Volume 176, December, 1978, Item 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference. *Research Disclosure* and *Product Licensing Index* are publications of Industrial Opportunities Ltd.; Homewell, Havant; Hampshire, P09 1EF, United Kingdom.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Preparation of Compound 1 (Emulsion Polymerization Technique)

To a 2 l header flask containing 500 ml of deaerated water were added 1.1 g sodium bisulfite, 217 g (2.09 mol) styrene, 316 g (2.09 mol) m,p-(60:40 mixture) chloromethylstyrene, 5.5 g (0.042 mol) divinylbenzene and 28.6 g of a 30 percent solution of Triton-X 770® anionic surfactant. This mixture was continuously stirred and bubbled with nitrogen for 15 minutes to emulsify the organic monomers. The contents of the header flask were then added to a 3 l reaction flask containing 1100 ml deaerated water, 4.2 g potassium persulfate, and 28.6 g of a 30 percent solution of Triton-X 770® anionic surfactant, to which had been added 0.28 g of sodium bisulfite just prior to the monomer addition. The reaction flask was preheated and maintained at 60° C. with stirring under nitrogen during the 100 minutes of addition of the header flask contents. After the addition of the header flask contents an additional 0.43 g of potassium persulfate and 0.14 g of sodium bisulfite were added and the reaction mixture was stirred for 3 more hours at 60° C. The resulting latex produced in the reaction flask was cooled to 25° C., filtered, and diluted with 2200 ml water to obtain 12 percent solids. This material was immediately treated with a solution of 408 g (2.09 mol) N,N-dimethyl-3,4-dimethoxybenzylamine in 750 ml of 2-propanol added dropwise with stirring. An initial coagulation due to charge neutralization occurred, and rapid stirring was necessary to effect redispersion as the addition continued. The reaction mixture was then heated for 4 hours at 60° C., cooled, filtered, and diafiltered against water through an OSMO Separator® 52-XO(PS)S-2 column for 20 volume passes.

The resulting latex was recovered in 76 percent yield (8.2 percent solids). An analytical sample was obtained by desiccation of an aliquot at 105° C. for 2 hours.

Anal. Calcd. for $C_{28}H_{34}ClNO_2$: C, 74.5; H, 7.6; N, 3.1; Cl, 7.8. Found: C, 74.4; H, 7.9; N, 2.5; Cl, 6.2.

EXAMPLE 2

Preparation of Compound 2 (Solution Polymerization Technique)

A solution of 140 g (1.34 mol) of styrene, 205 g (1.34 mol) of m,p-(60:40 mixture) chloromethylstyrene and 2.20 g (0.0134 mol) of 2,2'-azobis(2methylpropionitrile in 345 g toluene was sparged with nitrogen for 30 minutes, heated overnight (16 hours) at 60° C., cooled to room temperature, and treated with 268 g (1.37 mol) of N,N-dimethyl-3,4-dimethoxybenzylamine in 690 ml of 2-methoxyethanol. The reaction mixture was stirred under nitrogen for 16 hours at 60° C., cooled to room temperature, diluted with 690 ml of additional 2-methoxyethanol, and precipitated into ethyl acetate. The polymer was filtered, washed well with ethyl acetate, and then redissolved into 6 l of $H_2O$ by heating at reflux with stirring. The aqueous solution was dialyzed against $H_2O$ for 24 hours and concentrated to the desired volume at reduced pressure.

Yield: 76.5 percent; $\eta_{inh}=0.96$ dl/g in methanol

Anal. Calcd. for $C_{28}H_{34}ClNO_2$: C, 74.4; H, 7.6; N, 3.1; Cl, 7.8 Found: C, 71.4; H, 7.6; N, 3.3; Cl, 7.6

EXAMPLE 3

Photographic Test

A multicolor, photosensitive donor element of the peel-apart type was prepared by coating the following layers in the order recited on an opaque poly(ethylene terephthalate) film support. Coverages are parenthetically given in g/m².

(1) Polymeric acid layer of poly(n-butyl acrylate-co-acrylic acid) at a 30:70 weight ratio equivalent to 81 meq. acid/m²;

(2) Interlayer of poly(ethyl acrylate-co-acrylic acid/(80:20 wt. ratio) coated from a latex (0.54);

(3) Timing layer of a 1:9 physical mixture of poly(acrylonitrile-co-vinylidene chloride-co-acrylic acid) (weight ratio 14:79:7) and the carboxyester-lactone formed by cyclization of a vinyl acetate-maleic anhydride copolymer in the presence of 1-butanol to produce a partial butyl ester (ratio of acid:ester of 15:85) (4.8);

(4) A "gel-nitrate" layer (0.22) of bone gelatin and cellulose nitrate in a compatible solvent mixture of water, methanol and acetone (See Glafkides, "Photographic Chemistry", Vol. 1, Engl. Ed., page 468 (1958);

(5) Cyan RDR (0.47), and gelatin (1.5);

(6) Red-sensitive, negative silver chloride emulsion (0.29 Ag) and gelatin (0.62);

(7) Interlayer of 2,5-didodecylhydroquinone (0.54), gelatin (1.2) and ETA (0.48);

(8) Magenta RDR (0.48) and gelatin (1.0);

(9) Green-sensitive, negative silver chloride emulsion (0.51 Ag) and gelatin (0.90);

(10) Interlayer of 2,5-didodecylhydroquinone (0.54) gelatin (1.2) and ETA (0.48);

(11) Yellow RDR (0.68), and gelatin (1.2);

(12) Blue-sensitive, negative silver chloride emulsion layer (0.42 Ag) and gelatin (0.82);

(13) Interlayer of poly[styrene-co-1-vinylimidazole-co-3-(2-hydroxyethyl)-1-vinylimidazolium chloride] (50:40:10 wt. ratio) (0.11) in gelatin (0.81); and

(14) Overcoat layer of gelatin (0.89).

Cyan RDR

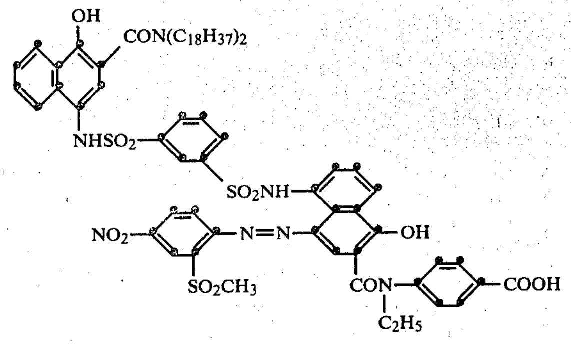

Dispersed in tritolyl phosphate (RDR: solvent 1:1)

Magenta RDR

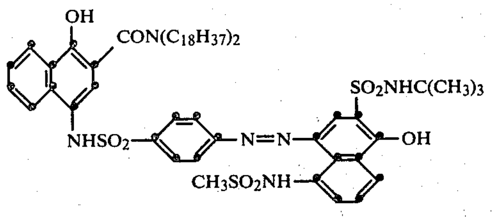

Dispersed in N,N-butylacetanilide (RDR: solvent 1:2)

Yellow RDR

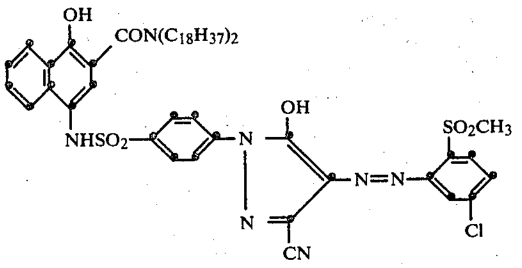

Dispersed in di-n-butyl phthalate (RDR: solvent 2:1)

ETA

-continued

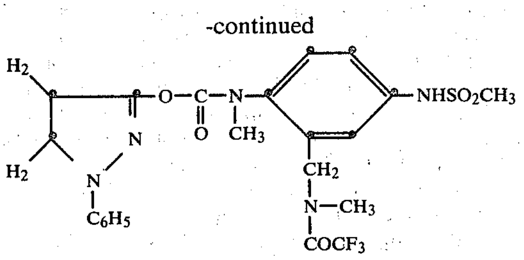

A. A control receiving element was prepared by coating a mordant from U.S. Pat. No. 3,958,995 (control) which was poly(styrene-co-N-benzyl-N,N-dimethyl-N-vinylbenzylammonium chloride-co-divinylbenzene) (49.5:49.5:1 mole ratio) (2.3 g/m$^2$) and gelatin (2.3 g/m$^2$), hardened with 1¼ percent formaldehyde, on a polyethylene-coated paper support.

B. A control receiving element similar to A was prepared except that the mordant was poly(styrene-co-N-(4-methoxybenzyl)-N,N-dimethyl-N-vinylbenzylammonium chloride-co-divinylbenzene) (49.5:49.5:1) as disclosed in U.S. Pat. No. 4,147,548.

C. A comparison receiving element was prepared similar to A except that the mordant was poly(4-methoxystyrene-co-N-benzyl-N,N-dimethyl-N-vinylbenzylammonium chloride-co-divinylbenzene (49.5:49.5:1).

D. A receiving element according to the invention was prepared similar to A except that the mordant was compound 1.

E. A receiving element according to the invention was prepared similar to A except that the mordant was compound 2.

F. A receiving element according to the invention was prepared similar to A except that the mordant was compound 6.

G. A receiving element according to the invention was prepared similar to A except that the mordant was compound 4.

H. A receiving element according to the invention was prepared similar to A except that the mordant was compound 5.

I. A receiving element according to the invention was prepared similar to A except that the mordant was compound 3.

An activator solution was prepared as follows:

| | |
|---|---|
| Potassium hydroxide | 0.6 N |
| 5-Methylbenzotriazole | 3.0 g/l |
| 11-Aminoundecanoic acid | 2.0 g/l |
| Potassium bromide | 2.0 g/l |
| Potassium sulfite | 8.0 g/l |

A sample of the donor element was exposed in a sensitometer through a step tablet to yield a near neutral at a Status A density of 0.8, soaked in the activator solution described above in a shallow-tray processor for 15 seconds at 28° C. (82.5° F.) and then laminated between nip rollers to a sample of the receiving elements described above. After ten minutes at room temperature, 22° C. (72° F.), the donor and receiver were peeled apart.

The Status A red, green and blue density curves were obtained by a computer integration of the individual step densities on the receiver. The receiver was then incubated under "HID fade" conditions, (2 weeks, 50 κLux measured at the surface, 35° C., 53 percent RH)

and the curves were again obtained. The loss in density, ΔD, from an original density of 1.6 was calculated. The following results were obtained:

TABLE 1

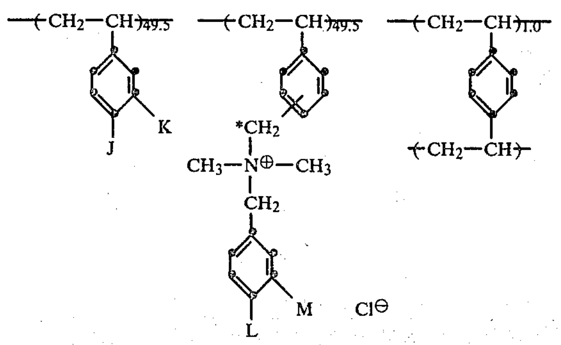

| Rec. | Mordant | J | K | L | M | $D_{max}/D_{min}$ Red | Green | Blue | Dye Loss Upon Incubation ΔD Red | Green | Blue |
|---|---|---|---|---|---|---|---|---|---|---|---|
| Set 1 | | | | | | | | | | | |
| **A | Cont. 1 | H | H | H | H | 2.6/0.16 | 2.3/0.12 | 2.3/0.16 | −1.1 | −1.3 | −1.1 |
| B | Cont. 2 | H | H | $OCH_3$ | H | 2.5/0.13 | 2.3/0.10 | 2.2/0.13 | −0.97 | −1.2 | −1.1 |
| D | Cmpd. 1 | H | H | $OCH_3$ | $OCH_3$ | 2.5/0.13 | 2.3/0.11 | 2.2/0.14 | −0.90 | −1.1 | −0.81 |
| E | Cmpd. 2 | H | H | $-OCH_2O-$ | | 2.4/0.13 | 2.2/0.11 | 2.2/0.13 | −0.98 | −1.1 | −0.79 |
| Set 2 | | | | | | | | | | | |
| **A | Cont. 1 | H | H | H | H | 2.8/0.20 | 2.6/0.13 | 2.6/0.20 | −0.82 | −1.1 | −1.0 |
| I | Cmpd. 3 | $OCH_3$ | $OCH_3$ | H | H | 2.8/0.13 | 2.5/0.11 | 2.5/0.16 | −0.87 | −1.0 | −0.75 |
| F | Cmpd. 6 | $OCH_3$ | $OCH_3$ | $OCH_3$ | $OCH_3$ | 2.8/0.13 | 2.5/0.11 | 2.5/0.16 | −0.69 | −0.82 | −0.53 |
| Set 3 | | | | | | | | | | | |
| **A | Cont. 1 | H | H | H | H | 2.7/0.24 | 2.6/0.14 | 2.5/0.18 | −1.0 | −1.3 | −1.1 |
| C | Comp. 1 | $OCH_3$ | H | H | H | 2.8/0.23 | 2.6/0.14 | 2.5/0.17 | −1.1 | −1.3 | −1.1 |
| G | Cmpd. 4 | $OCH_3$ | H | $OCH_3$ | H | 2.8/0.23 | 2.6/0.14 | 2.6/0.17 | −0.94 | −1.2 | −0.93 |
| H | Cmpd. 5 | $OCH_3$ | H | $OCH_3$ | $OCH_3$ | 2.6/0.20 | 2.5/0.13 | 2.4/0.16 | −0.91 | −1.1 | −0.81 |

*60:40 m-, p-mixture.
**Data for the sets were obtained at different times, hence, the values for Receiver A are not the same.

The above results indicate that all mordants have a good dye uptake (high $D_{max}$ values). In most instances, the mordants of the invention have less stain (lower $D_{min}$) than the control mordants, comparison mordant, or both.

In the first set of data, a comparison of Receiver D with Receivers A and B illustrate the synergistic effect obtained by the mordants of the invention. Dye loss upon incubation in the Red and Green areas improved as the amount of methoxy substitution is increased. In the Blue areas, however, no improvement in dye loss was obtained using the Control 2 mordant having one methoxy group as compared to the Control 1 mordant with no methoxy group. However, the Compound 1 mordant of the invention with two methoxy groups show a substantial improvement in Dye Loss (−0.81) as compared to the control mordants (−1.1 each). Thus, a mordant with two methoxy groups shows an improvement in Dye Loss which is greater than twice the improvement obtained with a mordant having only one methoxy group.

A comparison of Receiver E with Compound 2 mordant having a methylenedioxy group with Receiver D with Compound 1 mordant having two methoxy groups shows generally equivalent improvements in Dye Loss when both are compared to the Control Mordants 1 and 2.

In the second set of data, Receivers F and I containing the mordants according to the invention show substantial improvements in Dye Loss as compared to Control Receiver A. For Receiver F, there is almost a 50% improvement in the Blue area.

In the third set of data, Receiver C with the Comparison 1 mordant shows the effect of having only one methoxy group, but which is located on the styrene moiety. This Comparison 1 mordant was worse than the Control 1 mordant, having no methoxy groups, for Dye Loss in the red area and showed no change in the other areas. Receivers G and H containing the mordants according to the invention show substantial improvement in Dye Loss as compared to either the Control or Comparison mordants. This illustrates the unpredictability associated with adding methoxy substituents on different moieties of a mordant.

EXAMPLE 4

SANS Test

Example 3 was repeated except that the incubation conditions were "SANS fade" conditions (simulated-average-north-skylight) which is a 5.4 kLux Xenon source, 24° C. and 45%, relative humidity for 5 or 6 weeks shown in Table 1-A. The following results were obtained:

TABLE 1-A

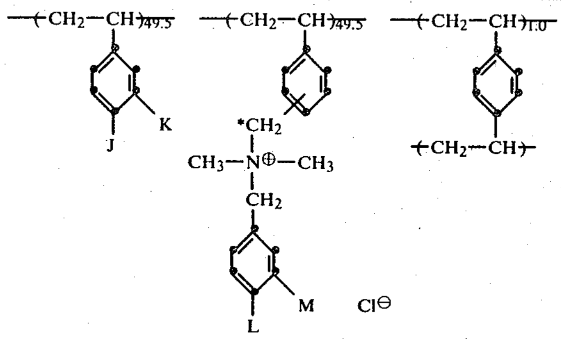

| Rec. | Mordant | J | K | L | M | SANS Test (Weeks) | Dye Loss Upon Incubation ΔD Red | Green | Blue |
|---|---|---|---|---|---|---|---|---|---|
| Set 1 | | | | | | | | | |
| **A | Cont. 1 | H | H | H | H | 6 | −0.43 | −0.73 | −0.41 |
| B | Cont. 2 | H | H | $OCH_3$ | H | 6 | −0.34 | −0.59 | −0.33 |
| D | Cmpd. 1 | H | H | $OCH_3$ | $OCH_3$ | 6 | −0.32 | −0.51 | −0.25 |
| E | Cmpd. 2 | H | H | $—OCH_2O—$ | | 6 | −0.33 | −0.48 | −0.22 |
| Set 2 | | | | | | | | | |
| **A | Cont. 1 | H | H | H | H | 6 | −0.33 | −0.57 | −0.40 |
| I | Cmpd. 3 | $OCH_3$ | $OCH_3$ | H | H | 6 | −0.30 | −0.50 | −0.26 |
| F | Cmpd. 6 | $OCH_3$ | $OCH_3$ | $OCH_3$ | $OCH_3$ | 6 | −0.22 | −0.33 | −0.19 |
| Set 3 | | | | | | | | | |
| **A | Cont. 1 | H | H | H | H | 5 | −0.35 | −0.60 | −0.26 |
| C | Comp. 1 | $OCH_3$ | H | H | H | 5 | −0.36 | −0.62 | −0.26 |
| G | Cmpd. 4 | $OCH_3$ | H | $OCH_3$ | H | 5 | −0.28 | −0.48 | −0.19 |
| H | Cmpd. 5 | $OCH_3$ | H | $OCH_3$ | $OCH_3$ | 5 | −0.26 | −0.40 | −0.16 |

*60:40 m-, p-mixture.
**Data for the sets were obtained at different times, hence, the values for Receiver A are not the same.

The above results indicate that in all cases, the mordants of the invention gave improvements in dye loss for each color area as compared to the control or comparison mordants.

EXAMPLE 5

Photographic Test

Receiving elements J and K were prepared as in Example 3 except that Compounds 8 and 9 were used as mordants as indicated in Table 2. Control receiver element A was prepared as in Example 3. These elements were processed as in Example 3 and gave the following results:

TABLE 2

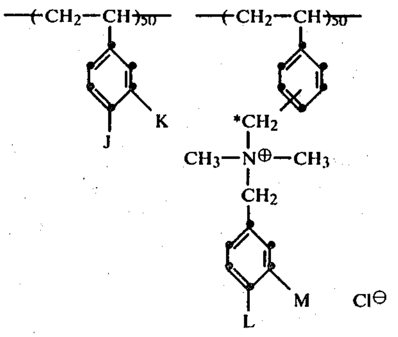

| Rec. | Mordant | J | K | L | M | $D_{max}/D_{min}$ Red | Green | Blue | Dye Loss Upon Incubation ΔD Red | Green | Blue |
|---|---|---|---|---|---|---|---|---|---|---|---|
| A | Cont. 1 | H | H | H | H | 2.4/0.16 | 2.5/0.11 | 2.4/0.15 | −1.0 | −1.3 | −1.2 |
| J | Cmpd. 8 | $—OCH_2O—$ | | H | H | 2.9/0.16 | 2.7/0.11 | 2.7/0.16 | −1.0 | −1.0 | −0.74 |
| K | Cmpd. 9 | $—OCH_2O—$ | | $—OCH_2O—$ | | 3.0/0.15 | 2.7/0.11 | 2.7/0.16 | −0.92 | −0.84 | −0.59 |

*60:40 m-, p-mixture

The above results indicate that the mordants of the invention containing one or more methylenedioxy groups have good dye retention, good $D_{max}/D_{min}$ discrimination, low $D_{min}$ and substantial improvement in Dye Loss as compared to Control Receiver A. For Receiver K, there is a 50% improvement in the Blue area.

EXAMPLE 6

SANS Test

Example 5 was repeated except that the incubation conditions were "SANS fade" conditions (see Example 4) for 6 weeks. The following results were obtained:

TABLE 2-A

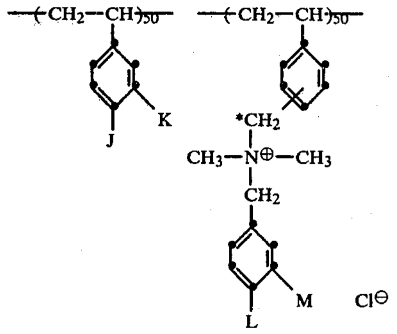

| Rec. | Mordant | J | K | L | M | Dye Loss Upon Incubation ΔD (SANS) Red | Green | Blue |
|---|---|---|---|---|---|---|---|---|
| A | Cont. 1 | H | H | H | H | −0.37 | −0.65 | −0.43 |
| J | Cmpd. 8 | —$OCH_2O$— | | H | H | −0.30 | −0.45 | −0.22 |
| K | Cmpd. 9 | —$OCH_2O$— | | —$OCH_2O$— | | −0.24 | −0.31 | −0.16 |

*60:40 m-, p-mixture

The above results indicate that in all cases the mordants of the invention gave improvements in dye loss for each color area as compared to the control mordant.

EXAMPLE 7

Photographic Test--Variations in Molar Percent

Receiving elements L, M, N and O were prepared as in Example 3, except that mordants having the molar proportions as set forth in Table 3 were employed. Control Receiver Element A was prepared as in Example 3. These elements were processed as in Example 3 and gave the following results:

TABLE 3

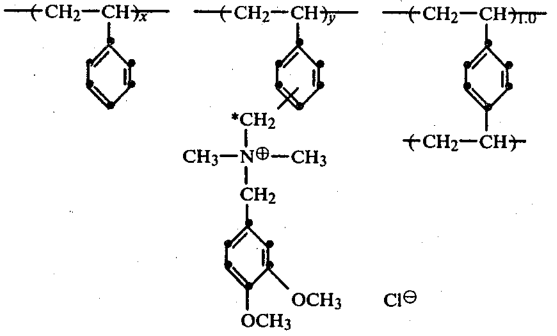

| Rec. | Mordant | Mole Percent x | y | $D_{max}/D_{min}$ Red | Green | Blue | Dye Loss Upon Incubation ΔD Red | Green | Blue |
|---|---|---|---|---|---|---|---|---|---|
| A | Control 1 | 49.5** | 49.5** | 2.9/0.17 | 2.6/0.12 | 2.6/0.16 | −0.84 | −1.2 | −1.1 |
| L | Comparison 2*** | 87 | 12 | 2.1/0.11 | 1.7/0.10 | 1.8/0.11 | −0.80 | −1.1 | −1.1 |
| M | Compound 1* | 75 | 24 | 2.5/0.11 | 2.3/0.09 | 2.2/0.13 | −0.73 | −1.0 | −0.94 |
| N | Compound 1 | 49.5 | 49.5 | 2.6/0.16 | 2.4/0.12 | 2.3/0.16 | −0.74 | −0.96 | −0.73 |
| O | Compound 1* | 24 | 75 | 2.5/0.16 | 2.3/0.16 | 2.2/0.16 | −0.64 | −0.76 | −0.51 |

*60:40 m-, p-mixture

**Control 1 Mordant does not have any methoxy substituents in "y" component.

***Structural formula is same as Compound 1, but the molar % is outside the range claimed.

*Structural formula is same as Compound 1, but the molar % is different.

The above results indicate that as the quaternized benzyl substituent is increased from 24 to 75 mole percent, an improvement in dye stability was observed due to the greater quantity of methoxyls (i.e., relative weight percent) available for a given polymer structure.

Receiver L containing Comparison 2 mordant having only 12 mole percent of the quaternized benzyl substituent showed some improvement in dye stability, but had unacceptably low $D_{max}$ and poor $D_{max}/D_{min}$ discrimination.

EXAMPLE 8

SANS Test

Example 7 was repeated except that the incubations conditions were "SANS fade" conditions (see Example 4) for 6 weeks. The following results were obtained.

TABLE 3-A

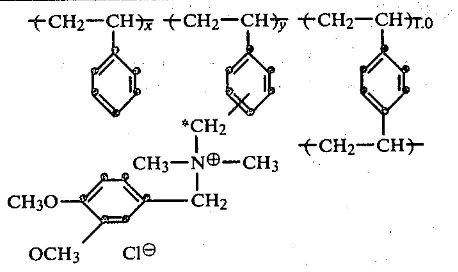

| Rec. | Mordant | Mole Percent x | Mole Percent y | Dye Loss Upon Incubation ΔD (SANS) Red | Green | Blue |
|---|---|---|---|---|---|---|
| A | Control 1 | 49.5** | 49.5** | −0.33 | −0.60 | −0.41 |
| L | Comparison 2*** | 87 | 12 | −0.27 | −0.61 | −0.30 |
| M | Compound 1**** | 75 | 24 | −0.27 | −0.49 | −0.34 |
| N | Compound 1 | 49.5 | 49.5 | −0.27 | −0.46 | −0.25 |
| O | Compound 1**** | 24 | 75 | −0.22 | −0.35 | −0.19 |

*60:40 m-, p-mixture
**Control 1 Mordant does not have any methoxy substituents in "y" component.
***Structural formula is same as Compound 1, but the molar % is outside the range claimed.
****Structural formula is same as Compound 1, but the molar % is different.

The above results indicate that in all cases the mordants of the invention gave improvements in dye loss for each color area as compared to the control mordant, comparison mordant, or both.

EXAMPLE 9

SANS Test

Receiving elements P and Q were prepared as in Example 3 except that Compounds 11 and 7 were used as mordants as indicated in Table 4. Control receiver element A was prepared as in Example 3. These elements were then processed as in Example 3 except that the incubation conditions were "SANS fade" conditions (see Example 4) for 5 weeks. The following results were obtained:

TABLE 4

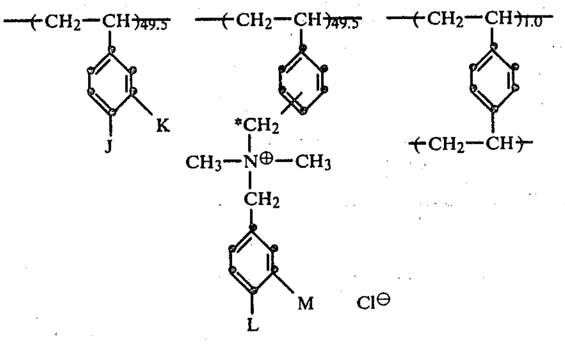

| Rec. | Mordant | J | K | L | M | $D_{max}/D_{min}$ Red | Green | Blue | Dye Loss Upon Incubation ΔD Red | Green | Blue |
|---|---|---|---|---|---|---|---|---|---|---|---|
| A | Cont. 1 | H | H | H | H | 2.7/0.14 | 2.6/0.13 | 2.4/0.17 | −0.36 | −0.60 | −0.33 |
| P | Cmpd. 11 | $-OCH_2O-$ | | $-OCH_2O-$ | | 2.7/0.11 | 2.7/0.12 | 2.5/0.15 | −0.19 | −0.35 | −0.15 |
| Q | Cmpd. 7 | $-OCH_2O-$ | | $OCH_3$ | $OCH_3$ | 2.7/0.13 | 2.7/0.13 | 2.5/0.16 | −0.18 | −0.32 | −0.14 |

*60:40 m-, p-mixture.

The above results indicate that the mordants of the invention have an approximate 50 percent improvement in dye loss for each color area as compared to the control mordant.

The invention has been described in detail with particular reference to preferred embodiments thereof, but it will be understood that variations and modifications can be effected within the spirit and scope of the invention.

What is claimed is:

1. In a photographic element comprising a support having thereon at least one photosensitive silver halide emulsion layer having associated therewith a dye image-providing material, said support also having thereon a dye image-receiving layer comprising a mordant, the improvement wherein said mordant is a polymer comprising recurring units having the formula:

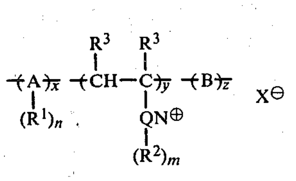

wherein

A represents recurring units derived from an α,β-ethylenically unsaturated monomer;

B represents recurring units derived from a monomer containing at least two ethylenically unsaturated groups;

QN⊕ represents a moiety containing a quaternized nitrogen group;

$R^1$ represents an alkoxy group having from 1 to about 8 carbon atoms or an alkylenedioxy group having from 1 to about 4 carbon atoms, said group being appended to an aromatic group of said A;

$R^2$ represents an alkoxy group having from 1 to about 8 carbon atoms or an alkylenedioxy group having from 1 to about 4 carbon atoms, said group being appended to an aromatic group of said QN⊕, each n and m independently represents an integer from 0 to 5, with the proviso that said polymer contains recurring units having at least two said alkoxy groups or one said alkylenedioxy group;

each $R^3$ independently represents hydrogen or an alkyl group having from 1 to about 6 carbon atoms;
$X^\ominus$ represents an anion;
x is from about 0 to about 80 mole percent;
y is from about 20 to about 100 mole percent; and
z is from about 0 to about 10 mole percent.

2. The element of claim 1 wherein said polymer comprises recurring groups having the formula:

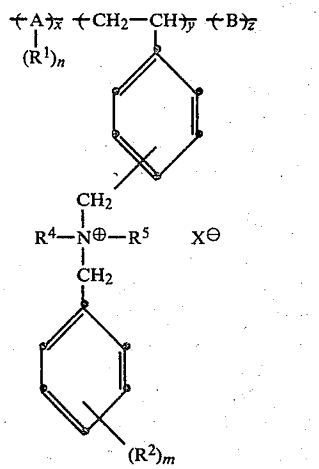

wherein
$R^4$ and $R^5$ independently represents a carbocyclic group or an alkyl group, or $R^4$ and $R^5$ may be taken together to complete a 5- or 6-membered heterocyclic ring, and
A, B, $R^1$, $R^2$, $X^\ominus$, n, m, x, y and z are defined as in claim 1.

3. The element of claim 1 wherein said polymer comprises recurring units having the formula:

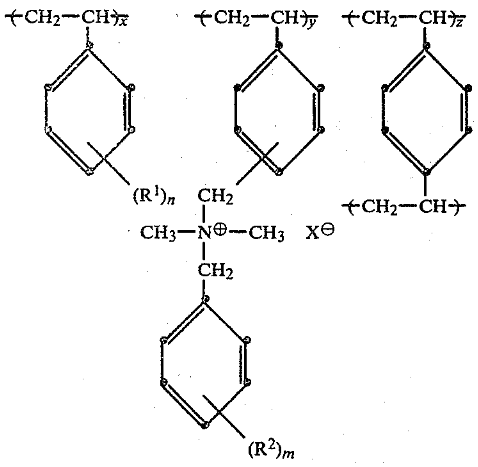

wherein
$R^1$, $R^2$, $X^\ominus$ n, m, x, y and z are defined as in claim 1.

4. The element of claim 3 wherein m is 0, n is 2 and each $R^1$ is methoxy located in the 3- and 4-positions, or m is 0, n is 1 and $R^1$ represents 3,4-methylenedioxy.

5. The element of claim 3 wherein n is 0, m is 2 and each $R^2$ is methoxy located in the 3- and 4-positions, or n is 0, m is 1 and $R^2$ represents 3,4-methylenedioxy.

6. The element of claim 3 wherein n and m independently represents either 1 or 2, and $R^1$ and $R^2$ each independently represents methoxy in the 4-position, methoxy in the 3- and 4-positions or 3,4-methylenedioxy.

7. The element of claim 1 wherein said support has thereon a red-sensitive silver halide emulsion layer having a cyan dye image-providing material associated therewith, a green-sensitive silver halide emulsion layer having a magenta dye image-providing material associated therewith, and a blue-sensitive silver halide emulsion layer having a yellow dye image-providing material associated therewith.

8. In a photographic assemblage comprising:
(a) a support having thereon at least one photosensitive silver halide emulsion layer having associated therewith a dye image-providing material; and
(b) a dye image-receiving layer comprising a mordant,
the improvement wherein said mordant is a polymer comprising recurring units having the formula:

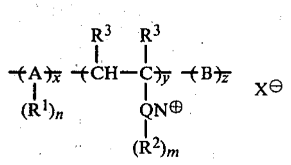

wherein
A represents recurring units derived from an $\alpha,\beta$-ethylenically unsaturated monomer;
B represents recurring units derived from a monomer containing at least two ethylenically unsaturated groups;
$QN^\oplus$ represents a moiety containing a quaternized nitrogen group;
$R^1$ represents an alkoxy group having from 1 to about 8 carbon atoms or an alkylenedioxy group having from 1 to about 4 carbon atoms, said group being appended to an aromatic group of said A;
$R^2$ represents an alkoxy group having from 1 to about 8 carbon atoms or an alkylenedioxy group having from 1 to about 4 carbon atoms, said group being appended to an aromatic group of said $QN^\oplus$;
each n and m independently represents an integer from 0 to 5, with the proviso that said polymer contains recurring units having at least two said alkoxy groups or one said alkylenedioxy group;
each $R^3$ independently represents hydrogen or an alkyl group having from 1 to about 6 carbon atoms;
$X^\ominus$ represents an anion;
x is from about 0 to about 80 mole percent;
y is from about 20 to about 100 mole percent; and
z is from about 0 to about 10 mole percent.

9. The assemblage of claim 8 which also contains an alkaline processing composition and means containing same for discharge within said assemblage.

10. The assemblage of claim 9 wherein said polymer comprises recurring groups having the formula:

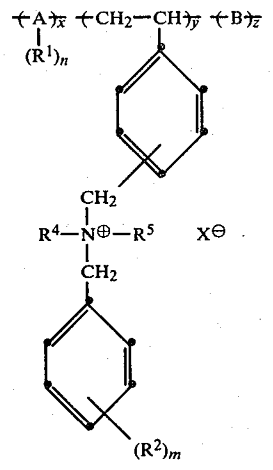

wherein $R^4$ and $R^5$ independently represents a carbocyclic group or an alkyl group, or $R^4$ and $R^5$ may be taken together to complete a 5- or 6-membered heterocyclic ring, and A, B, $R^1$, $R^2$, $X^\ominus$, n, m, x, y and z are defined as in claim 8.

11. The assemblage of claim 9 wherein said polymer comprises recurring units having the formula:

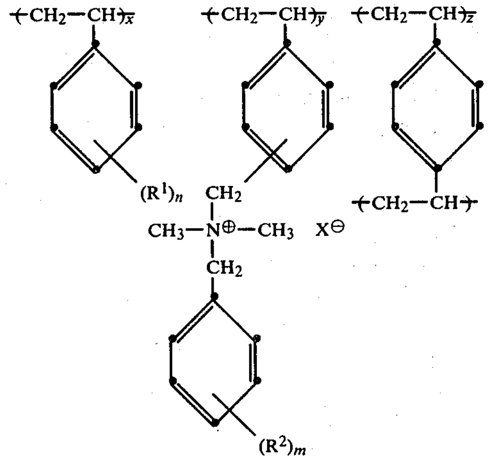

wherein $R^1$, $R^2$, $X^\ominus$, n, m, x, y and z are defined as in claim 8.

12. The assemblage of claim 11 wherein m is 0, n is 2 and each $R^1$ is methoxy located in the 3- and 4-positions, or m is 0, n is 1 and $R^1$ represents 3,4-methylenedioxy.

13. The assemblage of claim 11 wherein n is 0, m is 2 and each $R^2$ is methoxy located in the 3- and 4-positions, or n is 0, m is 1 and $R^2$ represents 3,4-methylenedioxy.

14. The assemblage of claim 11 wherein n and m independently represents either 1 or 2, and $R^1$ and $R^2$ each independently represents methoxy in the 4-position, methoxy in the 3- and 4-positions or 3,4-methylenedioxy.

15. The assemblage of claim 9 wherein (a) said dye image-receiving layer is located in said photosensitive element between said support and said silver halide emulsion layer; and (b) said assemblage also includes a transparent cover sheet over the layer outermost from said support.

16. The assemblage of claim 15 wherein said transparent cover sheet is coated with, in sequence, a neutralizing layer and a timing layer.

17. The assemblages of claim 16 wherein said discharging means is a rupturable container containing said alkaline processing composition and an opacifying agent, said container being so positioned that, during processing of said assemblage, a compressive force applied to said container will effect a discharge of the container's contents between said transparent cover sheet and the layer outermost from said support.

18. The assemblage of claim 9 wherein said support of said photosensitive element is opaque, and said dye image-receiving layer is located on a separate transparent support superposed on the layer outermost from said opaque support.

19. The assemblage of claim 18 wherein said transparent support has thereon, in sequence, a neutralizing layer, a timing layer and said dye image-receiving layer.

20. The assemblage of claim 18 wherein said opaque support has thereon, in sequence, a neutralizing layer, a timing layer and said silver halide emulsion layer.

21. The assemblage of claim 9 wherein said dye image-providing material is a redox dye-releaser.

22. The assemblage of claim 9 wherein said photosensitive element comprises a support having thereon a red-sensitive silver halide emulsion layer having a cyan dye image-providing material associated therewith, a green-sensitive silver halide emulsion layer having a magenta dye image-providing material associated therewith, and a blue-sensitive silver halide emulsion layer having a yellow dye image-providing material associated therewith.

23. In an integral photographic assemblage comprising (a) a photosensitive element comprising a transparent support having thereon the following layers in sequence: a dye image-receiving layer comprising a mordant, an alkaline solution-permeable, light-reflective layer; an alkaline solution-permeable, opaque layer; a red-sensitive, direct-positive silver halide emulsion layer having a ballasted redox cyan dye-releaser associated therewith; a green-sensitive, direct-positive silver halide emulsion layer having a ballasted redox magenta dye-releaser associated therewith; and a blue-sensitive, direct-positive silver halide emulsion layer having a ballasted redox yellow dye-releaser associated therewith;

(b) a transparent sheet superposed over said blue-sensitive silver halide emulsion layer and comprising a transparent support coated with, in sequence, a neutralizing layer and a timing layer; and (c) a rupturable container containing an alkaline processing composition and an opacifying agent, said container being so positioned during processing of said assemblage that a compressive force applied to said container will effect a discharge of the container's contents between said transparent sheet and said blue-sensitive silver halide emulsion layer;

said assemblage containing a silver halide developing agent, the improvement wherein said mordant is a polymer comprising recurring units having the formula:

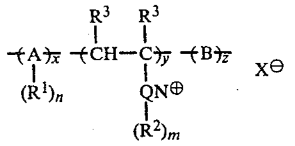

wherein

A represents recurring units derived from an α,β-ethylenically unsaturated monomer;

B represents recurring units derived from a monomer containing at least two ethylenically unsaturated groups;

QN⊕ represents a moiety containing a quaternized nitrogen group;

$R^1$ represents an alkoxy group having from 1 to about 8 carbon atoms or an alkylenedioxy group having from 1 to about 4 carbon atoms, said group being appended to an aromatic group of said A;

$R^2$ represents an alkoxy group having from 1 to about 8 carbon atoms or an alkylenedioxy group having from 1 to about 4 carbon atoms, said group being appended to an aromatic group of said QN⊕;

each n and m independently represents an integer from 0 to 5, with the proviso that said polymer contains recurring units having at least two said alkoxy groups or one said alkylenedioxy group;

each $R^3$ independently represents hydrogen or an alkyl group having from 1 to about 6 carbon atoms;

X⊖ represents an anion;

x is from about 0 to about 80 mole percent;

y is from about 20 to about 100 mole percent; and z is from about 0 to about 10 mole percent.

24. The assemblage of claim 23 wherein said polymer comprises recurring groups having the formula:

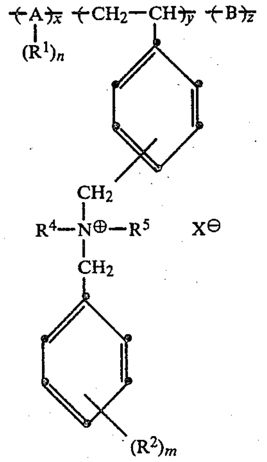

wherein $R^4$ and $R^5$ independently represents a carbocyclic group or an alkyl group, or $R^4$ and $R^5$ may be taken together to complete a 5- or 6-membered heterocyclic ring, and A, B, $R^1$, $R^2$, X⊖, n, m, x, y and z are defined as in claim 23.

25. The assemblage of claim 23 wherein said polymer comprises recurring units having the formula:

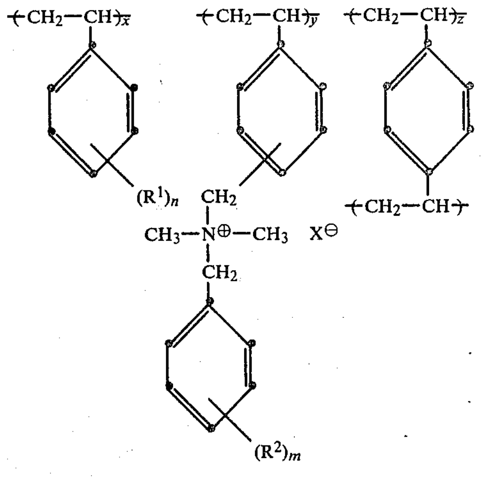

wherein $R^1$, $R^2$, X⊖, n, m, x, y and z are defined as in claim 23.

26. In a photographic element comprising a support having thereon a dye image-receiving layer comprising a mordant, the improvement wherein said mordant is a polymer comprising recurring units having the formula:

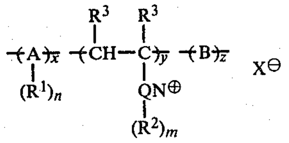

wherein

A represents recurring units derived from an α,β-ethylenically unsaturated monomer;

B represents recurring units derived from a monomer containing at least two ethylenically unsaturated groups;

QN⊕ represents a moiety containing a quaternized nitrogen group;

$R^1$ represents an alkoxy group having from 1 to about 8 carbon atoms or an alkylenedioxy group having from 1 to about 4 carbon atoms, said group being appended to an aromatic group of said A;

$R^2$ represents an alkoxy group having from 1 to about 8 carbon atoms or an alkylenedioxy group having from 1 to about 4 carbon atoms, said group being appended to an aromatic group of said QN⊕;

each n and m independently represents an integer from 0 to B 5, with the proviso that said polymer contains recurring units having at least two said alkoxy groups or one said alkylenedioxy group;

each $R^3$ independently represents hydrogen or an alkyl group having from 1 to about 6 carbon atoms;

X⊖ represents an anion;

x is from about 0 to about 80 mole percent;

y is from about 20 to about 100 mole percent; and z is from about 0 to about 10 mole percent.

27. The element of claim 26 wherein said polymer comprises recurring groups having the formula:

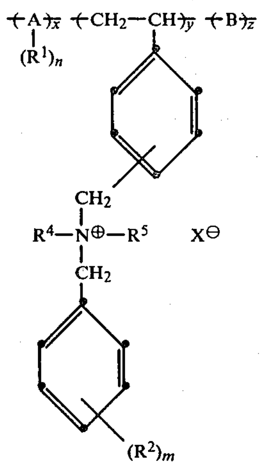

wherein $R^4$ and $R^5$ independently represents a carbocyclic group or an alkyl group, or $R^4$ and $R^5$ may be taken together to complete a 5- or 6-membered heterocyclic ring, and A, B, $R^1$, $R^2$, $X^\ominus$, n, m, x, y and z are defined as in claim 26.

28. The element of claim 27 wherein said polymer comprises recurring units having the formula:

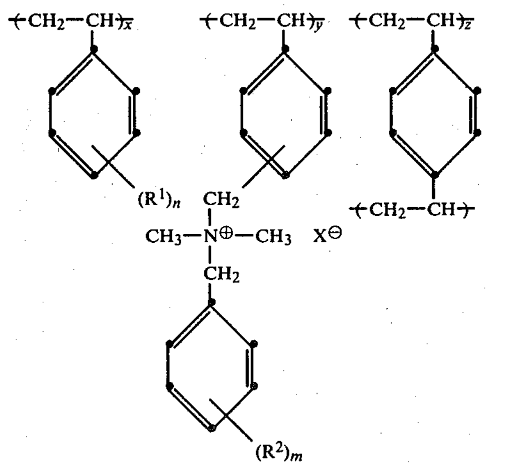

wherein $R^1$, $R^2$, $X^\ominus$, n, m, x, y and z are defined as in claim 26.

29. The element of claim 28 wherein m is 0, n is 2 and each $R^1$ is methoxy located in the 3- and 4-positions, or m is 0, n is 1 and $R^1$ represents 3,4-methylenedioxy.

30. The element of claim 28 wherein n is 0, m is 2 and each $R^2$ is methoxy located in the 3- and 4-positions, or n is 0, m is 1 and $R^2$ represents 3,4-methylenedioxy.

31. The element of claim 28 wherein n and m independently represents either 1 or 2, and $R^1$ and $R^2$ each independently represents methoxy in the 4-position, methoxy in the 3- and 4-positions or 3,4-methylenedioxy.

32. A polymer comprising recurring groups having the formula:

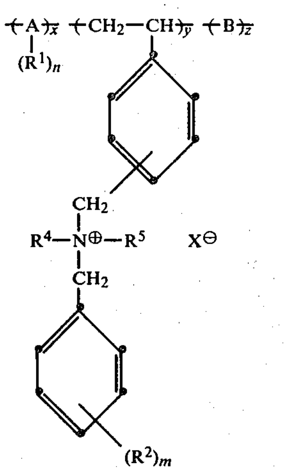

wherein $R^4$ and $R^5$ independently represents a carbocyclic group or an alkyl group, or $R^4$ and $R^5$ may be taken together to complete a 5- or 6-membered heterocyclic ring, and A represents recurring units derived from an $\alpha,\beta$-ethylenically unsaturated monomer;

B represents recurring units derived from a monomer containing at least two ethylenically unsaturated groups;

$R^1$ represents an alkoxy group having from 1 to about 8 carbon atoms or an alkylenedioxy group having from 1 to about 4 carbon atoms, said group being appended to an aromatic group of said A;

$R^2$ represents an alkoxy group having from 1 to about 8 carbon atoms or an alkylenedioxy group having from 1 to about 4 carbon atoms;

each n and m independently represents an integer from 0 to 5, with the proviso that said polymer contains recurring units having at least two said alkoxy groups or one said alkylenedioxy group;

$X^\ominus$ represents an anion;

x is from about 0 to about 80 mole percent;

y is from about 20 to about 100 mole percent; and z is from about 0 to about 10 mole percent.

33. The polymer of claim 32 wherein

A is 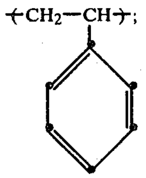; B is 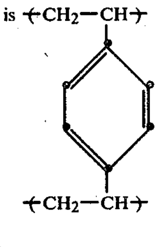

and $R^4$ and $R^5$ are each methyl.

34. The polymer of claim 33 wherein m is 0, n is 2 and each $R^1$ is methoxy located in the 3- and 4-positions, or m is 0, n is 1 and $R^1$ represents 3,4-methylenedioxy.

35. The polymer of claim 33 wherein n is 0, m is 2 and each $R^2$ is methoxy located in the 3- and 4-positions, or n is 0, m is 1 and $R^2$ represents 3,4-methylenedioxy.

36. The polymer of claim 33 wherein n and m independently represents either 1 or 2, and $R^1$ and $R^2$ each independently represents methoxy in the 4-position, methoxy in the 3- and 4-positions or 3,4-methylenedioxy.

* * * * *